United States Patent [19]

Persyk

[11] 4,454,422
[45] Jun. 12, 1984

[54] RADIATION DETECTOR ASSEMBLY FOR GENERATING A TWO-DIMENSIONAL IMAGE

[75] Inventor: Dennis E. Persyk, Barrington, Ill.

[73] Assignee: Siemens Gammasonics, Inc., Des Plaines, Ill.

[21] Appl. No.: 343,207

[22] Filed: Jan. 27, 1982

[51] Int. Cl.³ ............................ G01T 1/20; G01T 1/18
[52] U.S. Cl. ................................ 250/363 S; 250/374; 250/385
[58] Field of Search ................ 250/363 R, 363 S, 369, 250/374, 385

[56] References Cited

U.S. PATENT DOCUMENTS

| | | |
|---|---|---|
| 3,011,057 | 11/1961 | Anger . |
| 3,683,185 | 8/1972 | Muehllehner . |
| 3,971,942 | 7/1976 | Seidman et al. ................ 250/363 S |
| 4,069,421 | 1/1978 | Bourdel . |
| 4,104,516 | 8/1978 | Wang et al. . |
| 4,140,900 | 2/1979 | Wang . |
| 4,221,967 | 9/1980 | Wang et al. . |
| 4,376,892 | 3/1983 | Charpak et al. ................... 250/374 |

Primary Examiner—Janice A. Howell
Attorney, Agent, or Firm—Karl F. Milde, Jr.

[57] ABSTRACT

The radiation detector basically contains a vacuum window supported by a vacuum tight envelope, a scintillator, an interface, a photo-cathode, preferably a grid, an electron multiplier such as a multichannel plate, and a location sensitive detector. The radiation detector is particularly useful in generating two-dimensional images in nuclear medicine.

8 Claims, 4 Drawing Figures

RADIATION DETECTOR ASSEMBLY FOR GENERATING A TWO-DIMENSIONAL IMAGE

BACKGROUND OF THE INVENTION

1. Field of the Invention

This invention relates to a radiation detector assembly containing a photo-cathode for emission of photo-electrons upon impingement of light photons. In particular, this invention relates to a radiation detection assembly containing an electron multiplier such as a multichannel plate for multiplying photo-electrons emitted from a photo-cathode. Still more particularly, this invention relates to a radiation detective assembly for a two-dimensional imaging device applicable in nuclear medicine.

2. Description of the Prior Art

Radiation detecting devices utilizing a planar scintillation crystal and a plurality of photomultiplier tubes in an optical scanning arrangement with respect to the crystal are currently in use in a number of applications, such as in medical diagnostic equipment. A particular form of such a radiation detecting device is described in U.S. Pat. No. 3,011,057 (Anger), which discusses a radiation detecting device of a type in wide commercial use for locating a radiation source in two-dimensional coordinates. Such a device is known as a scintillation camera or gamma camera, and it is widely applied to rapidly project an image of the distribution of radioactivity throughout an object under examination, such as an organ of a living subject that has ingested a diagnostic quantity of a radioactive isotope.

A scintillation camera of this type produces an image of the radioactivity distribution by detecting individual gamma rays emitted from the distributed radioactive isotope. The gamma rays pass through a collimator to produce scintillations, that is scintillation light of a certain wave-length, in a thin planar scintillation crystal. The scintillation crystal or scintillator is typically made of thallium activated sodium iodide and has the form of a thin disc. A light guide or light pipe is provided for passing on the scintillation light. The scintillations are detected by an array of individual photomultiplier tubes which view overlapping areas of the crystal. Appropriate electronic circuits translate the outputs of the individual photomultiplier tubes into X and Y coordinate signals and a Z signal which indicates generally the energy of the scintillation event and whether that energy falls within a selected energy window. A visual display of the radioactivity distribution in the object may be obtained by coupling the X, Y and Z signals to a cathode ray oscilloscope or other image display device, where the individual scintillation events are displayed as small spots of light positioned in accordance with the X and Y coordinate signals.

Further details of a scintillation camera are described in U.S. Pat. No. 3,683,185 (Muehllehner).

Efforts have been made to reduce the weight and the size of radiation detecting devices which are determined to generate two-dimensional images of an object. This is particularly true for X-ray detection devices (see i.e. U.S. Pat. Nos. 4,104,516 and 4,140,900). These devices generally contain a vacuum window provided in an envelope, a scintillator, a photo-cathode attached thereto, and an imaging layer or screen spaced from the photo-cathode. The imaging layer or screen is directly observed. Means for providing an electrical signal in accordance with the displayed image are not provided.

Improvements on the Anger type gamma ray camera have focused on increasing the spatial resolution capabilities and increasing the capability for distinguishing between incident and scattered radiation, for instance, by incorporating a gamma ray sensitive, proximity type image intensifier tube (see i.e. U.S. Pat. No. 4,221,967). Yet, such a design requires an additional conversion stage where the scintillation light is converted into photo-electrons and subsequently again into light. It is desirable to avoid such an intermediate step. It is also desirable to change the camera design such that a large number of individual photomultiplier tubes or solid state photo-detectors for detecting the interaction sites of impinging gamma rays are no longer required.

SUMMARY OF THE INVENTION

1. Objects

It is an object of this invention to provide a radiation sensitive detector that has a compact design.

It is another object of this invention to provide a detector sensitive to gamma radiation which has good spatial and energy resolution, which resolutions are comparable with or even better than the resolution of a standard scintillation camera.

It is still another object of this invention to provide a gamma radiation sensitive detector which has a comparatively small size and weight.

It is still another object of this invention to design a single tube camera for penetrative radiation, such as X-ray radiation or preferably gamma radiation, which camera can be used for examinations of patients.

2. Summary

According to this invention, a radiation detector assembly contains a scintillator for receiving radiation to be detected and for emitting scintillation light in response to the received radiation. It also contains a photo-cathode. This photo-cathode receives the scintillation light from the scintillator and releases photo-electrons in accordance with the received scintillation light. Generally, scintillation light photons generated by a single ray release more than one photo-electron, that is they release a packet or cloud of photo-electrons.

The radiation detector assembly also contains an electron multiplier for multiplying the received photon-electrons. This electron multiplier has an input for receiving the photo-electrons from the photo-cathode and an output for emitting the multiplied photo-electrons. Each packet of photo-electrons received from the photo-cathode defines an impingement spot or impingement area on the input of the electron multiplier.

Starting from the output of the electron multiplier, the multiplied photo-electrons finally arrive at and impinge on the input area of a location sensitive sensor. The sensor is designed to determine directly the impingement location of any packet of multiplied photo-electrons received from the electron multiplier. The sensor delivers an output signal indicative of the impingement locations.

In a preferred embodiment of the invention, a grid is positioned between the photo-cathode and the input of the electron multiplier. A voltage source is provided for applying an electrical potential to the grid. The potential is such that each packet of photo-electrons generated in the photo-cathode is spread laterally on its way from the photo-cathode to the electron multiplier. Thereby, the impingement area of the packet of photo-electrons on the electron multiplier input is enlarged. Simultaneously, the electron density is reduced. In certain applications, this is a favorable result.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
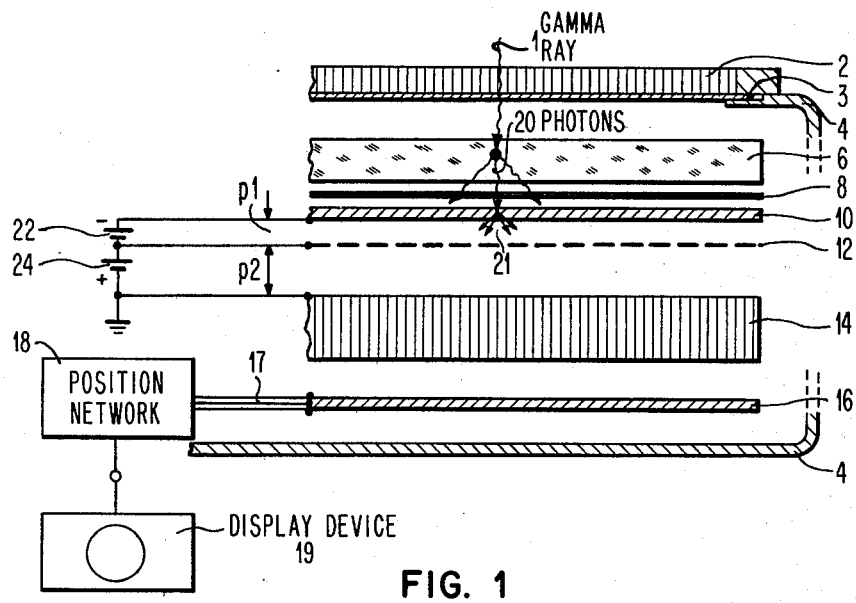
FIG. 1 is a schematic cross section of a radiation detector assembly including a grid according to this invention.

In FIG. 1 a two-dimensional radiation imaging detector is schematically illustrated. In this simplified diagram, a radiation emitting body, such as a human patient containing a small amount of a radioactive substance, emits radiation quanta such as gamma rays 1. These gamma rays 1 impinge on a parallel channel collimator 2 and pass through the channels thereof.

The imaging detector basically contains a vacuum window 3 supported by a vacuum tight envelope 4, a scintillator substance or scintillator 6, an interface 8, a photo-cathode 10, preferably a grid 12, an electron multiplier 14, and a location sensitive detector 16.

The vacuum window 3 allows the gamma rays 1 to enter into the interior of the envelope 4. This window 3 may consist of any conventional material such as beryllium, glass, etc. A preferred material, however, is a thin membrane of a metal such as stainless steel or aluminum.

The scintillator 6 may be any conventional flat scintillator crystal such as CsI(Na), CsI(Tl), NaI(Tl), etc. in the form of a plate. For the sake of clarity, the scintillator 6, the interface 8, and the photo-cathode 10 are shown expanded. In a practical design, the scintillator 6, the interface 8, and the input surface of the photo-cathode 10 are in intimate contact with each other, or they are at least optically coupled with each other. The interface 8 is optional. It is a dielectric boundary layer for matching the indices of refraction and simultaneously for providing a passivation layer. This boundary interface 8 may contain sputtered quartz, sputtered sapphire, etc. The photo-cathode 10 may be a flat layer or thin film of cesium antimonide, a bi-alkali photo-cathode, etc.

As may be noted in FIG. 1, there is a space provided between the photo-cathode 10 and the input surface of the imaging electron multiplier structure 14.

The electron multiplier structure 14 is a device for multiplying photo-electrons received from the photo-cathode 10. It may preferably comprise a multichannel plate (MCP) which is basically a thin plate having a large number of small holes or electron channels therein. Such MCP have widely been investigated, see for instance, "IEEE Transactions on Nuclear Science", Vol. NS-28, No. 1, Feb. 1981, and "Electronics Weekly", March 8, 1972. Alternatively the electron multiplier structure 14 may comprise a device known as "focused mesh electron multiplier". Such a device is produced, for instance, by Johnston Laboratories, U.S.A., as Models MM-1 and MM-2. Further so-called mesh-dynodes, Venetian-Blind dynodes, or another imaging dynode system may be applied.

The two-dimensional position sensitive detector 16 is an anode of a specific design having various output lines 17 connected to a position network 18. It receives packets of multiplied photo-electrons from the electron multiplier 14. The read-out signals of the detector 16 yield information on the centroids of the impingement location of the electron packets impinging on the detector 16. The position network 18 processes this information for display on a display device 19. Thus, the detector 16 is a centroid-detecting anode structure.

Position sensitive detectors 16 indicating the impingement locations of radiation quanta are well-known as such, for instance, from U.S. Pat. Nos. 3,209,201, 3,934,143 and 3,812,361, "Review of Scientific Instruments" 50(9), Sept. 1979, p. 1093-1098, and "Review of Scientific Instruments" 52(7), July 1981, p. 1067-1074. Position networks 18 as such are well-known from literature on scintillation cameras, for instance from U.S. Pat. Nos. 3,011,057 (Anger) and 3,683,185 (Muehllehner).

According to FIG. 1, a gamma ray 1 enters through the collimator 2 and the vacuum window 2 into the interior of the imaging detector. Upon impingement on the scintillator 6, the gamma ray 1 produces a scintillation spot which emits scintillation light. Typically, the extent of such a scintillation spot may be less than one millimeter. The scintillation light penetrates the interface 8 and enters the photo-cathode 10. Here, scintillation light photons 20 due to a single gamma ray 1 generally release a whole packet or cloud 21 of photo-electrons. The resulting photo-electron emission spot may still be considered a point source. The photo-electron angular distribution is Lambertian, imparting a finite spread to the electron cloud or packet 21.

The electron multiplier 14 has an input surface for receiving the photo-electrons from the photo-cathode 10. An electrical field is applied between the photo-cathode 10 and the electron multiplier 14. This field is generated by two voltage sources 22 and 24. It accelerates the photo-electrons, thereby bending their paths towards the surface of the electron multiplier 14.

Figures 2, 3:
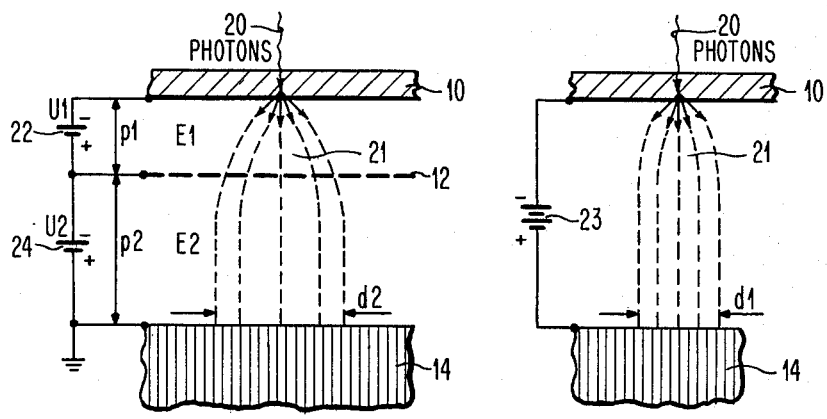
FIG. 2 is an enlarged partial view of the radiation detector assembly according to FIG. 1, illustrating certain operation when the grid is omitted.
FIG. 3 is an enlarged partial view of the radiation detector assembly according to FIG. 1, illustrating certain operation when the grid is interposed between a photo-cathode and an electron multiplier, according to this invention.

In FIG. 2 is illustrated in an enlarged representation what the result will be if the grid 12 is not present. The electron cloud or packet 21 will arrive at the plane input surface of the electron multiplier 14 in a beam having a comparatively small diameter d1. This diameter d1 may typically be between 0.5 and 1.0 millimeter. Thus, each impinging packet 21 of photo-electrons defines a relatively small impingement area on the input surface. The electron packet 21 defines an electron charge density $\sigma$ (number of electrons/cm$^2$) on the surface of the electron multiplier 14 which is relatively large.

It has been observed that in many cases, especially if the electron multiplier 14 is a microchannel plate (MCP), it is desirable that the electron density $\sigma$ be relatively small in magnitude. From FIG. 3 is will become apparent, that the grid 12 serves to control the photo-electron charge density σ within the imaging detector.

Electron multipliers 14 such as microchannel plates require small electron densities σ on their input surface to maintain linear operation. It should be noted that microchannel plates operated in the saturation mode are linear in their operation. In order to operate in the saturated mode, it is required that only one photo-electron travels along a single bore hole of the MCP for each scintillation event. This requirement is not met with convenient distances and practical acceleration voltages between photo-cathode 10 and multiplier 14. There would be more than one electron per bore hole. A microchannel plate is typically a few tenth of a millimeter thick, and the bore diameter is typically a few microns (μm). In the saturated mode, one photo-electron per bore hole produces a saturated charge output which may typically be $10^5$ electrons.

In FIG. 3 is illustrated what the result will be if the grid 12 is present.

The electron-transparent grid 12 interposed in the space between the photo-cathode 10 and the electron multiplier structure 14 has the effect of spreading out the photo-electrons of each packet 21. To be precise, the grid 12 has applied to it an electrical potential such that each packet 21 of photo-electrons generated in the photo-cathode 10 is spread out laterally as it passes from the photo-cathode 10 to the input surface of the electron multiplier 14.

For this purpose, a first electrical field E1 is generated between the photo-cathode 10 and the grid 12, and a second electrical field E2 is generated between the grid 12 and the input surface of the electron multiplier 14. The first field E1 is generated by a suitable DC voltage source 22, and the second field E2 is generated by a suitable DC voltage source 24. Both fields E1 and E2 are accelerating fields. The strength of the second field E2 is larger than the strength of the first field E1. As a result, the photo-electrons 21 can spread to a certain degree transversely, that is travel in their emission direction in the space between the photo-cathode 10 and the grid 12. After having passed through the grid 12, they are forced to travel along the field lines of the stronger field E2.

In FIG. 3 the diameter of the packet 21 on the surface of the electron multiplier 14 is denoted by d2. This diameter d2 is larger than the diameter d1 illustrated in FIG. 2. In other words, the grid 12 spreads the packet 21, thereby enlarging the impingement area of the packet 21 on the input surface of the electron multiplier 14. Thus, the electrons of the packet 21 are now distributed over several multiplier input elements such as bore holes in a MCP, such that each bore hole does not receive more than one electron. The electron charge density σ is significantly reduced. Subsequently, the centroid will be detected at the location sensitive detector 16.

Thus, the diffuser grid 12 illustrated in FIGS. 1 and 3 serves to decrease the electron density σ on the surface of the electron multiplier 14. If a multichannel plate (MCP) is used, this will permit linear operation without degrading the performance.

Figure 4:
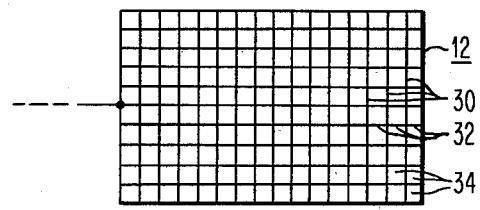
FIG. 4 is a plan view of a grid applicable in a radiation detector assembly according to this invention.

In FIG. 4 a portion of a grid 12 is illustrated. In particular, the grid 12 may be a photo-etched metal grid comprised of a large number of thin conductors 30 and 32. In the illustrated embodiment, the conductors 30 and 32 are in a rectangular arrangement, thereby forming small square openings 34 for passing electrons therethrough. The spacings between neighboring conductors 30 and 32 are chosen to suit the desired purpose. It has been found that in some instances spacings of 0.5 to 1.0 millimeters can favorably be used. As the individual conductors 30, 32 are comparatively thin, the grid 12 may be transparent up to a degree of 95%.

It should be mentioned that a diffuser grid 12 can be used in any photo-emissive device between its photo-cathode and its photo-electron collecting anode for the purpose of decreasing the photo-electron charge density. Yet, it has been found that such a grid has a particular usefulness in two-dimensional nuclear medicine imaging devices, especially in devices operating with gamma radiation.

For the purpose of illustration and not for limitation, typical spacings and electrical potentials may be as follows: The distance (p1+p2) between the photo-cathode 10 and the electron multiplier 14 may be between 1 and 10 millimeters, and the potential difference (U1+U2) may be 300 volts. The distance p1 between the photo-cathode 10 and the grid 12 may be between 1 and 5 millimeters. The potential difference U1 may be between 1 and 100 volts, depending on the distance p1. For instance, the following values may be chosen: p1=⅓cm; p2=⅔ cm; U1=20 V, U1+U2=300 V. Thus, the photo-electrons initially find themselves in a weak field E1 of E1=20 V/0.333 cm=60 V/cm and therefore tend to travel in their initial emission directions for a distance p1 before experiencing the more intense field E2=280 V/0.666 cm=420 V/cm.

Photo-electrons typically exit the photo-cathode 10 with an initial energy of the order of 0 to 1.5 eV, for a photon energy of 3 eV (corresponding to a wavelength of 420 nm) and a cathode band gap of approximately 1.5 eV. It is desirable to have a low potential difference U1 between the photo-cathode 10 and the grid 12 to inhibit secondary emission from the grid 12, and a high enough electric field E1, E2 to provide efficient transport of photo-electrons from the photo-cathode 10 to the electron multiplier 14. These conditions can be met by suitable values p1, U1, and p2, U2, for instance, by the values cited above.

The radiation detection device illustrated in FIG. 1 is an alternative to the Anger scintillation camera. This alternative is characterized by a smaller size and a lower weight. A large number of photomultiplier tubes is not required in order to obtain electrical signals in accordance with the radiation image. Only a single location sensitive detector is applied in this alternative.

It has been mentioned that a grid 12 is used when a microchannel plate is incorporated as an electron multiplication device. The reason is to have on an average significantly less than one electron per input bore, such that the probability of two electrons in a single bore is very low. Such a grid 12 can also be used in conjunction with any non-spreading electron multiplier 14 where the diameter of the individual multiplier inputs is larger than a resolution element of the image, for example, in conjunction with a box and grid multiplier. Such a grid 12 can also be applied in a radiation detector having a non-spreading electron multiplier 14, if centroid detection is desired. In such a case centroid finding anodes may be assembled in a configuration like the photomultipliers in an Anger scintillation camera, that is in hexagonally packed circles.

While the forms of the radiation detecting assembly herein described constitute preferred embodiments of the invention, it is to be understood that the invention is not limited to these precise forms of assembly, and that a variety of changes may be made therein without departing from the scope of the invention.

What is claimed is:

1. A radiation detector assembly, comprising in combination:
   (a) a scintillator substance for receiving radiation to be detected and for emitting scintillation light in response to said received radiation;
   (b) a photo-cathode for receiving said scintillation light from said scintillator substance and for releasing photo-electrons in accordance therewith, whereby scintillation light photons generated by a single radiation quantum generally release a packet of photo-electrons;
   (c) an electron multiplier for multiplying the number of said photo-electrons, said electron multiplier having an input for receiving said photo-electrons from said photo-cathode and an output for emitting multiplied photo-electrons, whereby each received packet of photo-electrons defines an impingement area on said input;
   (d) sensor means having an input area for receiving said multiplied photo-electrons from said electron multiplier, said sensor means determining the impingement location of said packet of multiplied photo-electrons on said input-area;
   (e) a grid positioned between said photo-cathode and said input of said electron multiplier; and
   (f) means for applying an electrical potential in the range of 1 to 300 volts to said grid such that each packet of photo-electrons generated in said photo-cathode is spread laterally as it passes from said photo-cathode to said electron multiplier, thereby enlarging the impingement area of said packet of electrons on said input of said electron multiplier.

2. The radiation detector assembly according to claim 1, wherein said grid comprises a plurality of conductors in a rectangular arrangement, adjacent ones of said conductors having a respective spacing of 0.5 to 1.0 millimeters.

3. The radiation detector assembly according to claim 1, wherein said electron multiplier is a microchannel plate.

4. A radiation detector assembly, comprising in combination:
   (a) a scintillator substance for receiving radiation to be detected and for emitting scintillation light in response to said received radiation;
   (b) a photo-cathode for receiving said scintillation light from said scintillator substance and for releasing photo-electrons in accordance therewith, whereby scintillation light photons generated by a single radiation quantum generally release a packet of photo-electrons;
   (c) an electron multiplier for multiplying the number of said photo-electrons, said electron multiplier having an input for receiving said photo-electrons from said photo-cathode and an output for emitting multiplied photo-electrons, whereby each received packet of photo-electrons defines an impingement area on said input;
   (d) sensor means having an input area for receiving said multiplied photo-electrons from said electron multiplier, said sensor means determining the impingement location of said packet of multiplied photo-electrons on said input-area;
   (e) a grid positioned between said photo-cathode and said input of said electron multiplier; and
   (f) means for applying an electrical potential to said grid such that each packet of photo-electrons generated in said photo-cathode is spread laterally as it passes from said photo-cathode to said electron multiplier, thereby enlarging the impingement area of said packet of electrons on said input of said electron multiplier;

wherein a first electrical field is provided between said photo-cathode and said grid, and wherein a second electrical field is provided between said grid and said electron multiplier, whereby the strength of said second electrical field is larger than the strength of said first electrical field.

5. The radiation detector assembly according to claim 4, wherein said first electrical field is about 60 V/cm and said second electrical field is about 420 V/cm.

6. The radiation detector assembly according to claim 4, wherein said electron multiplier is a microchannel plate.

7. A radiation sensitive detector, comprising in combination:
   (a) a vacuum envelope;
   (b) an input window provided in said vacuum envelope for transmitting said radiation into the interior of said vacuum envelope;
   (c) a scintillator substance positioned adjacent to said input window for receiving said radiation and for generating scintillation events in response to said radiation, said scintillator substance emitting scintillation light for each scintillation event;
   (d) a photo-cathode for converting said scintillation light into photo-electrons, said photo-cathode having an input surface in optical contact with said scintillation medium;
   (e) an electron multiplier for multiplication of photo-electrons received from said photo-cathode; and
   (f) an anode sensitive to the impingement location for collecting said multiplied photo-electrons from said electron multiplier and for directly converting the information about the impingement locations of packets of said multiplied photo-electrons into electrical signals, said signals thereby determining the locations of said scintillation events.

8. The radiation sensitive detector according to claim 7, wherein said electron multiplier is spaced from said photo-cathode, further comprising a grid positioned between said photo-cathode and said electron multiplier for spreading symmetrically the density of packets of said photo-electrons.

* * * * *